(12) United States Patent
Taylor et al.

(10) Patent No.: US 11,399,015 B2
(45) Date of Patent: Jul. 26, 2022

(54) DATA SECURITY TOOL

(71) Applicant: BANK OF AMERICA CORPORATION, Charlotte, NC (US)

(72) Inventors: Jo-Ann Taylor, Godalming (GB);
Manu Jacob Kurian, Dallas, TX (US);
Michael Robert Young, Davidson, NC (US)

(73) Assignee: Bank of America Corporation, Charlotte, NC (US)

( * ) Notice: Subject to any disclaimer, the term of this patent is extended or adjusted under 35 U.S.C. 154(b) by 436 days.

(21) Appl. No.: 16/437,598

(22) Filed: Jun. 11, 2019

(65) Prior Publication Data

US 2020/0396210 A1 Dec. 17, 2020

(51) Int. Cl.
*H04L 29/06* (2006.01)
*H04L 9/40* (2022.01)
*H04L 9/32* (2006.01)
*H04L 9/08* (2006.01)

(52) U.S. Cl.
CPC ........ *H04L 63/0428* (2013.01); *H04L 9/0861* (2013.01); *H04L 9/321* (2013.01)

(58) Field of Classification Search
CPC ......... H04L 9/32; H04L 9/0861; H04L 9/321; H04L 63/04; H04L 63/14; H04L 63/0428
USPC ........................................................ 713/170
See application file for complete search history.

(56) References Cited

U.S. PATENT DOCUMENTS

| | | | |
|---|---|---|---|
| 3,149,869 | A | 9/1964 | Chamberlin |
| 4,687,467 | A | 8/1987 | Cygielski |
| 4,878,899 | A | 11/1989 | Plouff |
| 5,002,189 | A | 3/1991 | Sahi |
| 5,088,173 | A | 2/1992 | Kromer |
| 5,328,476 | A | 7/1994 | Bidwell |
| 5,575,773 | A | 11/1996 | Song |
| 5,579,070 | A | 11/1996 | Smart |
| 5,600,395 | A | 2/1997 | Balling |
| 5,609,272 | A | 3/1997 | Brass |
| 5,629,750 | A | 5/1997 | Smart |
| 5,729,768 | A | 3/1998 | Fields |
| 5,761,542 | A | 6/1998 | Lamphron |
| 6,120,508 | A | 9/2000 | Grunig |
| 6,148,404 | A | 11/2000 | Yatsukawa |
| 6,177,391 | B1 | 1/2001 | Zafar |
| 6,353,939 | B1 | 3/2002 | Arber |
| 6,402,730 | B1 | 6/2002 | Malowaniec |
| 6,636,697 | B2 | 10/2003 | Smith |
| 6,908,030 | B2 | 6/2005 | Rajasekaran |
| 6,950,129 | B1 | 9/2005 | Minne |
| 7,093,664 | B2 | 8/2006 | Todd |
| 7,210,166 | B2 | 4/2007 | Davis |
| 7,351,224 | B1 | 4/2008 | Shaw |

(Continued)

*Primary Examiner* — Amare F Tabor

(57) ABSTRACT

An apparatus includes a memory and a hardware processor. The memory stores identification information of a user. The processor receives from a device a request for the identification information of the user and in response to the request, appends a data element to the identification information to produce a protected message. The processor also encrypts the protected message to produce an encrypted message and communicates the encrypted message to the device. The data element executes in response to the encrypted message being decrypted, and the data element encrypts the identification information when the data element executes.

15 Claims, 3 Drawing Sheets

(56) References Cited

U.S. PATENT DOCUMENTS

| | | |
|---|---|---|
| 7,461,270 B2 | 12/2008 | Thibadeau |
| 7,493,402 B2 | 2/2009 | McCarty |
| 7,568,631 B2 | 8/2009 | Gibbs |
| 7,840,993 B2 | 11/2010 | Ganesan |
| 8,627,080 B2 | 1/2014 | Wankmueller |
| 8,769,270 B2 | 7/2014 | Orsini et al. |
| 8,797,138 B2 | 8/2014 | Myers |
| 8,943,598 B1 | 1/2015 | Kurian |
| 9,053,329 B2 | 6/2015 | Lam |
| 9,177,335 B1* | 11/2015 | Carasso ............... G06F 16/957 |
| 9,230,084 B2 | 1/2016 | Robertson |
| 9,276,943 B2 | 3/2016 | Anderson et al. |
| 9,436,722 B1 | 9/2016 | Bent et al. |
| 9,477,682 B1 | 10/2016 | Bent et al. |
| 9,665,868 B2 | 5/2017 | Varadarajan |
| 9,989,728 B2 | 6/2018 | Kawamura |
| 10,057,269 B1 | 8/2018 | Ellingson |
| 10,097,443 B2* | 10/2018 | Hittel ..................... H04L 9/30 |
| 10,291,395 B1* | 5/2019 | Nenov ............... H04L 63/0428 |
| 10,999,076 B2* | 5/2021 | Chen ..................... H04L 67/12 |
| 11,102,647 B2* | 8/2021 | Zhou .................... H04W 12/03 |
| 11,126,670 B2* | 9/2021 | Pandey .............. H04L 63/0807 |
| 2002/0098994 A1 | 7/2002 | Zafar |
| 2004/0103060 A1 | 5/2004 | Foth |
| 2005/0099499 A1 | 5/2005 | Braunstein |
| 2010/0124329 A1* | 5/2010 | Lyman .................. G06F 21/608 |
| | | 380/255 |
| 2019/0065770 A1* | 2/2019 | Poe ..................... G06F 21/6218 |
| 2019/0289004 A1* | 9/2019 | Kurian ................ H04L 67/303 |

* cited by examiner

DATA SECURITY TOOL

TECHNICAL FIELD

This disclosure relates generally to data security.

BACKGROUND

Online and digital transactions frequently involve the communication of personal information over networks.

SUMMARY OF THE DISCLOSURE

Online and digital transactions frequently involve the communication of personal information over networks. This personal information may be compromised in a number of ways. For example, the personal information may be taken by malicious users from any repository or device to which the personal information is communicated. As another example, the personal information may be intercepted in transit by malicious users. These malicious users may then use the personal information to impersonate other users or sell the personal information to other malicious actors.

This disclosure contemplates a data security tool that improves the security of information (e.g., personal information) by appending certain data elements like software code to information. The data elements execute when the information has been transmitted or accessed on another device. During execution, the data elements encrypt the information so that the information becomes illegible and inaccessible. This type of encryption may be irreversible (e.g., the information may not be later decrypted). In this manner, access to the information is limited to the first device that receives the information, and even that device may access the information only once. As a result, it is not possible for malicious users to take the information from the device that receives the information, and even if the malicious users take the information from the original repository, the malicious users are not able to send or sell the information to another device without rendering the information inaccessible. Certain embodiments of the data security tool are described below.

According to an embodiment, an apparatus includes a memory and a hardware processor. The memory stores identification information of a user. The processor receives from a device a request for the identification information of the user and in response to the request, appends a data element to the identification information to produce a protected message. The processor also encrypts the protected message to produce an encrypted message and communicates the encrypted message to the device. The data element executes in response to the encrypted message being decrypted, and the data element encrypts the identification information when the data element executes.

According to another embodiment, a method includes storing, by a memory, identification information of a user and receiving, by a hardware processor communicatively coupled to the memory, from a device a request for the identification information of the user. The method also includes in response to the request, appending, by the hardware processor, a data element to the identification information to produce a protected message and encrypting, by the hardware processor, the protected message to produce an encrypted message. The method further includes communicating, by the hardware processor, the encrypted message to the device and decrypting, by the device, the encrypted message. The method also includes executing the data element in response to the encrypted message being decrypted and encrypting, by the data element, the identification information when the data element executes.

According to yet another embodiment, a system includes a device and a data security tool. The data security tool stores identification information of a user and receives, from the device, a request for the identification information of the user. The data security tool also in response to the request, appends a data element to the identification information to produce a protected message and encrypts the protected message to produce an encrypted message. The data security tool further communicates the encrypted message to the device. The data element executes on the device in response to the encrypted message being decrypted by the device, and the data element encrypts the identification information when the data element executes on the device.

Certain embodiments provide one or more technical advantages. For example, an embodiment improves data security by encrypting information when that information has been accessed once. As another example, an embodiment improves data security by encrypting information when that information has been transmitted. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
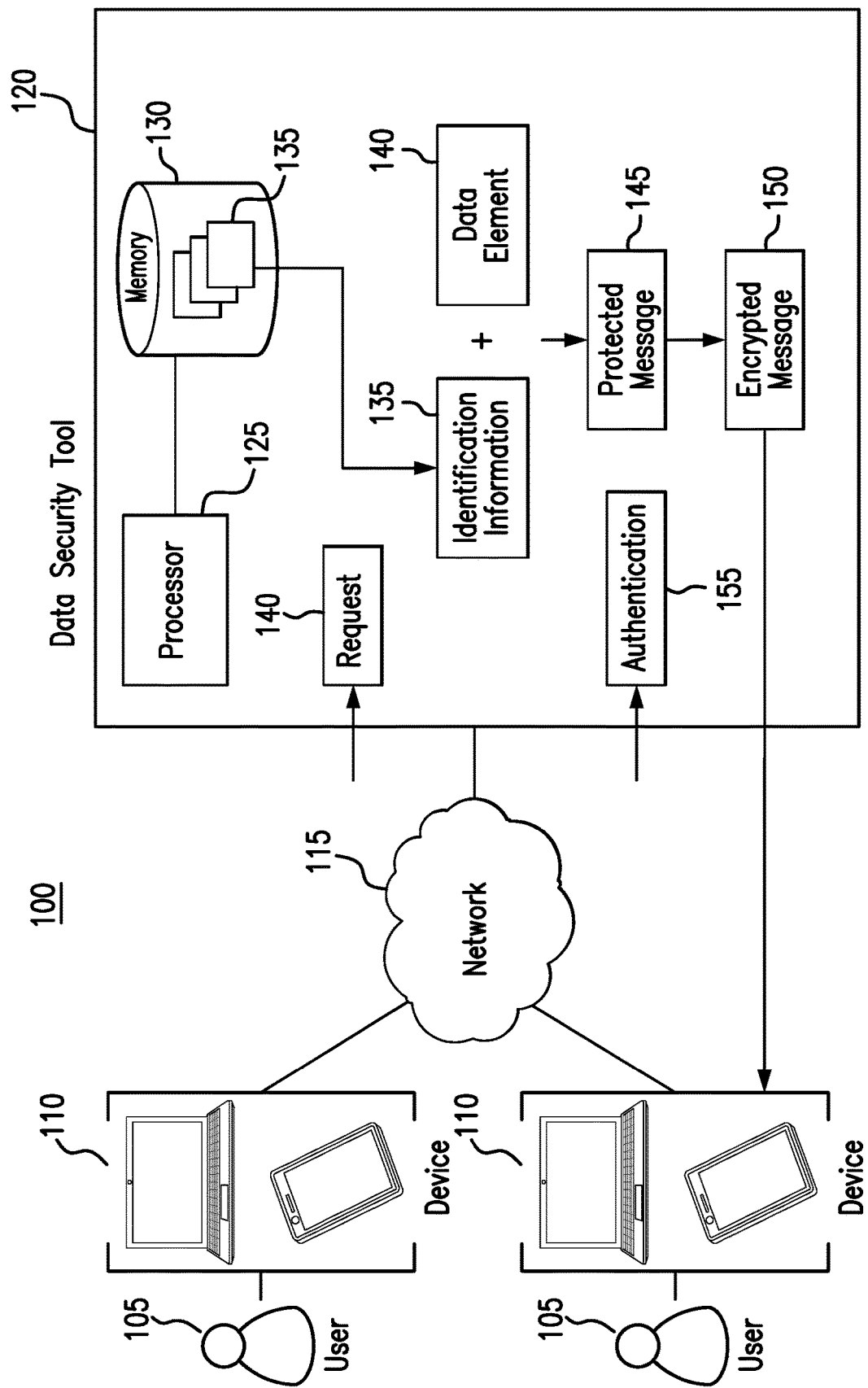
FIG. 1 illustrates an example system.
Figure 2:
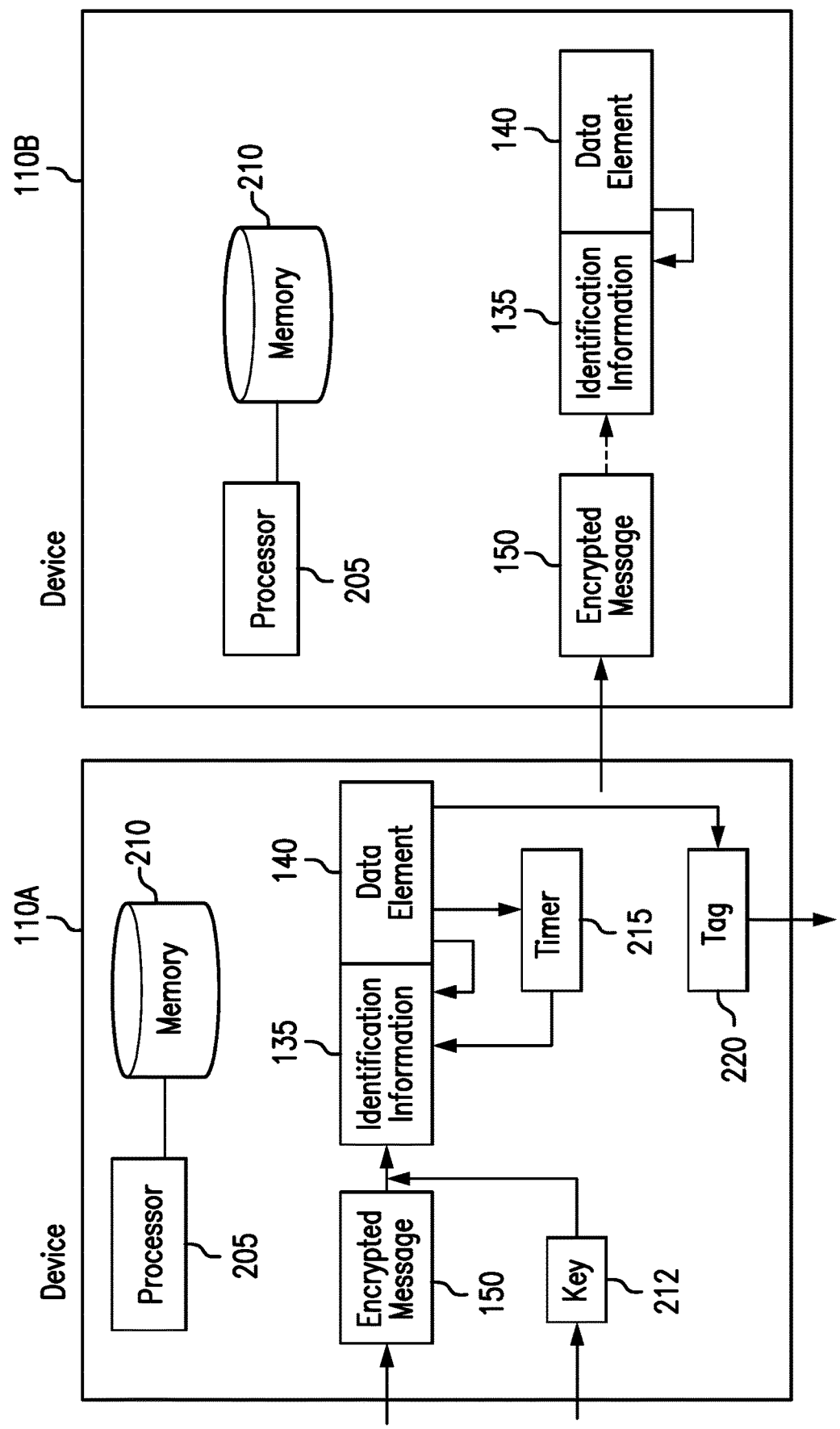
FIG. 2 illustrates example devices of the system of FIG. 1.
Figure 3:
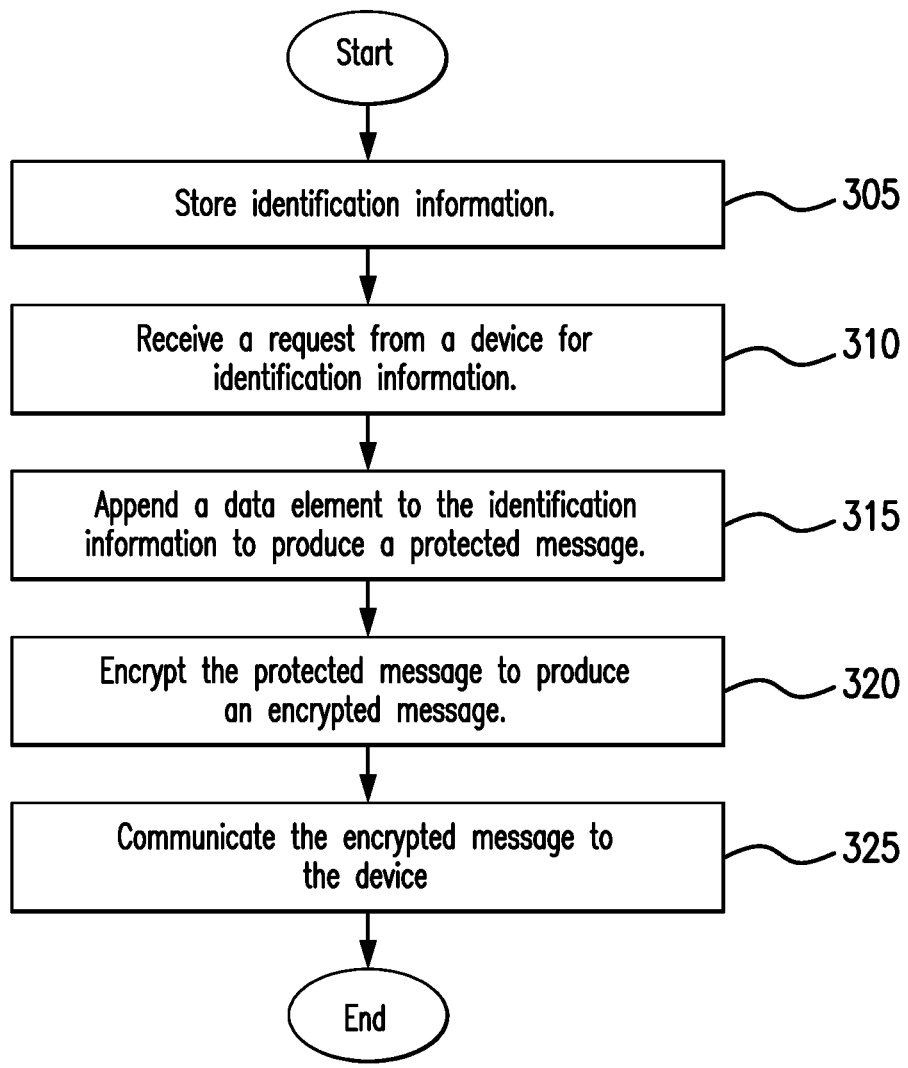
FIG. 3 is a flowchart illustrating a method for improving data security using the system of FIG. 1.

Embodiments of the present disclosure and its advantages are best understood by referring to FIGS. 1 through 3 of the drawings, like numerals being used for like and corresponding parts of the various drawings.

Online and digital transactions frequently involve the communication of personal information over networks. This personal information may be compromised in a number of ways. For example, the personal information may be taken by malicious users from any repository or device to which the personal information is communicated. As another example, the personal information may be intercepted in transit by malicious users. These malicious users may then use the personal information to impersonate other users or sell the personal information to other malicious actors.

This disclosure contemplates a data security tool that improves the security of information (e.g., personal information) by appending certain data elements like software code to information. The data elements execute when the information has been transmitted or accessed on another device. During execution, the data elements encrypt the information so that the information becomes illegible and inaccessible. This type of encryption may be irreversible (e.g., the information may not be later decrypted). In this manner, access to the information is limited to the first device that receives the information, and even that device may access the information only once. As a result, it is not possible for malicious users to take the information from the device that receives the information, and even if the malicious users take the information from the original repository, the malicious users are not able to send or sell the information to another device without rendering the information inaccessible. The system and the data security tool will be described in more detail using FIGS. 1 through 3.

FIG. 1 illustrates an example system 100. As shown in FIG. 1, system 100 includes one or more devices 110, a network 115, and a data security tool 120. Generally, data security tool 120 protects the personal information of users 105 by appending one or more data elements to the personal information before communicating that personal information to other components of system 100. The data element detects when the personal information has been transmitted and/or accessed. In response to such detection, the data element encrypts the personal information such that the personal information becomes illegible and/or inaccessible. In this manner, the personal information is protected from further access and transmission. As a result, malicious actors will not be able to use and/or sell the personal information.

Users 105 use devices 110 to communicate with components of system 100. For example, users 105 may use devices 110 to request personal information of user 105. As another example, user 105 can use device 110 to request that personal information be communicated to another device 110.

In conventional systems, when personal information is retrieved and/or communicated to a device 110, that personal information becomes susceptible to being compromised and/or taken by malicious actors. For example, a malicious actor may take the personal information from the receiving device. As another example, a malicious actor may intercept the personal information as it is being transmitted to the receiving device. When the malicious actor accesses the personal information, the malicious actor may use that personal information to impersonate a user 105. Additionally, the malicious actor may sell that personal information to other malicious actors thereby further compromising the personal information.

Devices 110 include any appropriate device for communicating with components of system 100 over network 115. For example, devices 110 may be a telephone, a mobile phone, a computer, a laptop, a tablet, an automated assistant, and/or a cash register. This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Data security tool 120 includes a processor 125 and a memory 130. This disclosure contemplates processor 125 and memory 130 being configured to perform any of the functions of data security tool 120 described herein. Generally, data security tool 120 protects the personal information of user 105 by appending one or more data elements to the personal information before communicating the personal information to other components of system 100. The data element may detect when the personal information has been transmitted and/or accessed, and in response, encrypt the personal information so that it becomes illegible and/or inaccessible. In this manner, data security tool 120 protects personal information from being taken from other components of system 100 and/or from being sold to other malicious actors. In certain embodiments, data security tool 120 improves the security of personal information by appending one or more data elements to the personal information that limits the number of times that personal information can be transmitted and/or accessed.

Processor 125 is any electronic circuitry, including, but not limited to microprocessors, application specific integrated circuits (ASIC), application specific instruction set processor (ASIP), and/or state machines, that communicatively couples to memory 130 and controls the operation of data security tool 120. Processor 125 may be 8-bit, 16-bit, 32-bit, 64-bit or of any other suitable architecture. Processor 125 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 125 may include other hardware that operates software to control and process information. Processor 125 executes software stored on memory to perform any of the functions described herein. Processor 125 controls the operation and administration of data security tool 120 by processing information received from devices 110, network 115, and memory 130. Processor 125 may be a programmable logic device, a microcontroller, a microprocessor, any suitable processing device, or any suitable combination of the preceding. Processor 125 is not limited to a single processing device and may encompass multiple processing devices.

Memory 130 may store, either permanently or temporarily, data, operational software, or other information for processor 125. Memory 130 may include any one or a combination of volatile or non-volatile local or remote devices suitable for storing information. For example, memory 130 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 130, a disk, a CD, or a flash drive. In particular embodiments, the software may include an application executable by processor 125 to perform one or more of the functions described herein.

Data security tool 120 stores personal information of a user 105. In the example of FIG. 1, data security tool 120 stores identification information 135. Identification information 135 may be any information that can be used to identify a user 105. For example, identification information 135 may include a name, an address, a social security number, a title, an account number, a user name, an alias, an image, or biometric information of a user 105. If identification information 135 were compromised or accessed by a malicious actor, then a malicious actor may use identification information 135 to impersonate a user 105.

Data security tool 120 receives a request 140 from one or more devices 110. Request 140 may be a request for identification information 135 of a user 105. In response to receiving request 140, data security tool 120 retrieves the requested identification information 135. Data security tool 120 then prepares identification information 135 to be transmitted to other components of system 100. In some instances, request 140 may request that identification information 135 be sent to the requesting device. In other instances, request 140 may request that identification information 135 be sent to another device.

Data security tool 120 prepares identification information 135 for transmission by appending one or more data elements 140 to identification information 135. Data element 140 may be software code that attaches to identification information 135. The software code may execute when identification information 135 is in transit and/or on a receiving device 110. In certain embodiments, appending data elements 140 to identification information 135 involves incorporating identification information 135 in a software package. The software package executes on a receiving device 110 and controls access to identification information 135. Generally, data element 140 controls or limits the access and/or transmission of identification information 135. This process will be explained in more detail using FIG. 2.

Data security tool 120 forms a protected message 145 by appending one or more data elements 140 to identification information 135. In some instances, protected message 145 may be a software package that incorporates identification information 135.

Data security tool 120 encrypts protected message 145 to produce an encrypted message 150. This disclosure contemplates data security tool 120 performing any suitable encryption method on protected message 145 to produce encrypted message 150. Generally, identification information 135 may be illegible and/or inaccessible until encrypted message 150 has been decrypted. Data security tool 120 then communicates encrypted message 150 to a receiving device 110. This disclosure contemplates data security tool 120 communicating encrypted message 150 to any device 110 of system 100.

In certain embodiments, data security tool 120 communicates encrypted message 150 only after a requesting user 105 authenticates himself. In the example of FIG. 1, data security tool 120 receives an authentication message 155 from a user 105. Authentication message 155 may include authentication credentials for a user 105. For example, authentication message 155 may include a username, a password, a code, and/or biometric information that can be used to authenticate the user 105. After the user 105 has been authenticated, data security tool 120 may communicate encrypted message 150 to a device 110 of system 100 based on request 140.

FIG. 3 illustrates example devices 110A and 110B of the system 100 of FIG. 1. As seen in FIG. 2, devices 110A and 110B include a processor 205 and a memory 210. This disclosure contemplates processor 205 and memory 210 being configured to perform any of the functions of devices 110A and 110B. In certain embodiments, devices 110A and 110B protect identification information by executing data elements appended to received identification information. Generally, executing the appended data elements causes received identification information to be encrypted after the identification information has been transmitted or accessed once. In some instances, the identification information is irretrievably encrypted, such that the identification information is no longer legible and/or accessible. As a result, the identification information cannot be taken from device 110 and/or transferred to another device 110, thus improving the security of the identification information.

Processor 205 is any electronic circuitry, including, but not limited to microprocessors, application specific integrated circuits (ASIC), application specific instruction set processor (ASIP), and/or state machines, that communicatively couples to memory 210 and controls the operation of device 110. Processor 205 may be 8-bit, 16-bit, 32-bit, 64-bit or of any other suitable architecture. Processor 205 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 205 may include other hardware that operates software to control and process information. Processor 205 executes software stored on memory to perform any of the functions described herein. Processor 205 controls the operation and administration of device 110 by processing information received from devices 110, network 115, and memory 210. Processor 205 may be a programmable logic device, a microcontroller, a microprocessor, any suitable processing device, or any suitable combination of the preceding. Processor 205 is not limited to a single processing device and may encompass multiple processing devices.

Memory 210 may store, either permanently or temporarily, data, operational software, or other information for processor 205. Memory 210 may include any one or a combination of volatile or non-volatile local or remote devices suitable for storing information. For example, memory 210 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 210, a disk, a CD, or a flash drive. In particular embodiments, the software may include an application executable by processor 205 to perform one or more of the functions described herein.

Device 110A receives an encrypted message 150 from data security tool 120. Encrypted message 150 may include encrypted versions of identification information 135 and data element 140. Device 110A may have received encrypted message 150 because device 110A communicated a request for identification information 135. In some instances, device 110A may have received encrypted message 150 because another device 110 requested that identification information 135 be sent to device 110A.

Device 110A decrypts encrypted message 150 to access identification information 135. In some instances, device 110A may receive a key 212 from data security tool 120. Data security tool 120 may have generated key 212. Device 110A may use key 212 to decrypt encrypted message 150.

Data element 140 may begin executing on device 110A when data element 140 is received by device 110A. Data element 140 may monitor access and/or transmission of identification information 135. For example, data element 140 may start a timer 215 when key 212 is received by device 110A and/or when device 110A decrypts encrypted message 150. While timer 215 is running, device 110A may be allowed to access identification information 135. When timer 215 expires, data element 140 encrypts identification information 135. Thus, it may be the case that device 110A encrypts identification information 135 in response to device 110A receiving key 212 and/or in response to device 110A decrypting encrypted message 150. In some instances, this encryption makes identification information 135 irretrievable. In other words, there may be no mechanism to decrypt identification information 135 once data element 140 has encrypted identification information 135. Data element 140 may also encrypt identification information 135 after and/or in response to device 110A accessing identification information 135. In this manner, device 110A has limited access to identification information 135 as controlled by data element 140.

This disclosure contemplates data element 140 limiting access to identification information 135 in any suitable manner. For example, data element 140 may detect when identification information 135 has been accessed by device 110A. In response, data element 140 may encrypt identification information 135. As another example, data element 140 may encrypt identification information 135 when timer 215 expires. As yet another example, data element 140 may encrypt identification information 135 in response to device 110A receiving key 212.

In particular embodiments, data element 140 generates a tag 220 in response to data element 140 encrypting identification information 135. Tag 220 may indicate that identification information 135 has been encrypted. Tag 220 may be communicated back to data security tool 120 to alert data security tool that identification information 135 has been encrypted by data element 140. In this manner, data security tool 120 may stay apprised of identification information that is vulnerable or susceptible to be compromised by malicious actors in system 100.

In certain instances, data element 140 prevents identification information 135 from being transmitted by device 110A. For example, if device 110A attempts to transmit encrypted message 150 to device 110B, then data element 140 may detect that encrypted message 150 is being communicated to an external device 110. In response, data element 140 may encrypt identification information 135 within encrypted message 150 such that a receiving device of encrypted message 150 cannot access identification information 135 even if encrypted message 150 is decrypted. In this manner, data element 140 protects identification information 135 from being transmitted more than once. As a result, malicious actors cannot compromise identification information 135 even if these malicious actors take identification information 135 from device 110A. Additionally, malicious actors cannot sell identification information 135 and transfers identification information 135 to other devices. Although FIG. 2 illustrates data element 140 executing on device 110B to encrypt identification information 135 after device 110B has received encrypted message 150, this disclosure contemplates that data element 140 may execute on device 110A to encrypt identification information 135 before device 110A transmits encrypted message 150 to device 110B.

FIG. 3 is a flowchart, illustrating a method 300 for improving data security using the system 100 to FIG. 1. In certain embodiments, data security tool 120 performs the steps in method 300. By performing method 300, data security tool 120 improves the security of information within system 100.

Data security tool 120 begins by storing identification information in step 305. In step 310, data security tool 120 receives a request from a device for identification information. Data security tool 120 appends a data element to the identification information to produce a protected message in step 315. In certain embodiments, appending the data element may involve incorporating the identification information in a software package.

In step 320, data security 120 encrypts the protected message to produce an encrypted message. Data security tool 120 communicates the encrypted message to the device in step 325. The data element may then control access and/or transmission of the encrypted message and/or the identification information on the device. The data element may encrypt the identification information when subsequent transmission attempts are made for the encrypted message and/or the identification information. Additionally, the data element may encrypt the identification information after the identification information has been accessed by the device.

Modifications, additions, or omissions may be made to method 300 depicted in FIG. 3. Method 300 may include more, fewer, or other steps. For example, steps may be performed in parallel or in any suitable order. While discussed as data security tool 120 performing the steps, any suitable component of system 100, such as device(s) 110 for example, may perform one or more steps of the methods.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
a memory configured to store identification information of a user; and
a hardware processor communicatively coupled to the memory, the hardware processor configured to:
receive from a device a request for the identification information of the user;
in response to the request, append a data element to the identification information to produce a protected message, the data element comprising executable software code;
encrypt the protected message to produce an encrypted message; and
communicate the encrypted message to the device;
detect that the device attempts to decrypt the encrypted message, wherein the data element executes the executable software code in response to the encrypted message being decrypted and wherein the data element encrypts the identification information when the executable software code of the data element executes;
wherein:
the data element starts a timer when the data element executes; and the data element encrypts the identification information when the timer expires; and
in response to encrypting the identification information, the data element generates and communicates to the hardware processor a tag indicating that the identification information has been encrypted.

2. The apparatus of claim 1, wherein:
the data element detects when the identification information has been accessed when the data element executes; and
the data element encrypts the identification information in response to detecting that the identification information has been accessed.

3. The apparatus of claim 1, wherein the hardware processor is further configured to:
generate a key that can be used to decrypt the encrypted message; and
communicate the key to the device, wherein the data element encrypts the identification information in response to the device receiving the key.

4. The apparatus of claim 1, wherein:
the data element executes in response to detecting that the encrypted message has been communicated by the device to a second device; and
the data element encrypts the identification information in response to detecting that the encrypted message has been communicated to the second device.

5. The apparatus of claim 1, wherein the hardware processor is further configured to authenticate at least one of the device and the user before communicating the encrypted message to the device.

6. A method comprising:
storing, by a memory, identification information of a user; and
receiving, by a hardware processor communicatively coupled to the memory, from a device a request for the identification information of the user;
in response to the request, appending, by the hardware processor, a data element to the identification information to produce a protected message, the data element comprising executable software code;
encrypting, by the hardware processor, the protected message to produce an encrypted message;
communicating, by the hardware processor, the encrypted message to the device;
decrypting, by the device, the encrypted message;
executing the executable software code of the data element in response to the encrypted message being decrypted; and
encrypting, by the data element, the identification information when the executable software code of the data element executes;
further comprising:
starting a timer when the data element executes, wherein the data element encrypts the identification information when the timer expires; and
generating a tag indicating that the identification information has been encrypted; and communicating, by the device, the tag to the hardware processor.

7. The method of claim 6, further comprising detecting when the identification information has been accessed when the data element executes, wherein the data element encrypts the identification information in response to detecting that the identification information has been accessed.

8. The method of claim 6, further comprising:
generating, by the hardware processor, a key that can be used to decrypt the encrypted message; and
communicating, by the hardware processor, the key to the device, wherein the data element encrypts the identification information in response to the device receiving the key.

9. The method of claim 6, further comprising:
executing the data element in response to detecting that the encrypted message has been communicated by the device to a second device; and
encrypting the identification information in response to detecting that the encrypted message has been communicated to the second device.

10. The method of claim 6, further comprising authenticating at least one of the device and the user before communicating the encrypted message to the device.

11. A system comprising:
a device;
a data security tool configured to:
store identification information of a user;
receive, from the device, a request for the identification information of the user;
in response to the request, append a data element to the identification information to produce a protected message, the data element comprising executable software code;
encrypt the protected message to produce an encrypted message; and
communicate the encrypted message to the device;
detect that the device attempts to decrypt the encrypted message, wherein the data element executes the executable software code on the device in response to the encrypted message being decrypted by the device and wherein the data element encrypts the identification information when the executable software code of the data element executes on the device;
wherein:
the data element starts a timer on the device when the data element executes; and the data element encrypts the identification information on the device when the timer expires; and
in response to encrypting the identification information, the data element generates and communicates to the data security tool a tag indicating that the identification information has been encrypted.

12. The system of claim 11, wherein:
the data element detects when the identification information has been accessed on the device when the data element executes; and
the data element encrypts the identification information on the device in response to detecting that the identification information has been accessed.

13. The system of claim 11, wherein the data security tool is further configured to:
generate a key that can be used to decrypt the encrypted message; and
communicate the key to the device, wherein the data element encrypts the identification information in response to the device receiving the key.

14. The system of claim 11, wherein:
the data element executes in response to detecting that the encrypted message has been communicated by the device to a second device; and
the data element encrypts the identification information in response to detecting that the encrypted message has been communicated to the second device.

15. The system of claim 11, wherein the data security tool is further configured to authenticate at least one of the device and the user before communicating the encrypted message to the device.

* * * * *